United States Patent
Sampath et al.

(10) Patent No.: US 10,567,537 B2
(45) Date of Patent: Feb. 18, 2020

(54) OPTIMIZING WEB APPLICATIONS USING A RENDERING ENGINE

(71) Applicant: Citrix Systems, Inc., Fort Lauderdale, FL (US)

(72) Inventors: Santosh Sampath, Karnataka (IN); Vipin Borkar, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 110 days.

(21) Appl. No.: 15/595,026

(22) Filed: May 15, 2017

(65) Prior Publication Data
US 2018/0332132 A1 Nov. 15, 2018

(51) Int. Cl.
*H04L 29/08* (2006.01)

(52) U.S. Cl.
CPC .......... *H04L 67/2828* (2013.01); *H04L 67/02* (2013.01); *H04L 67/2842* (2013.01)

(58) Field of Classification Search
CPC . H04L 67/2823; H04L 67/2828; H04L 67/02; H04L 67/2842; G06F 17/30905; G06F 16/957; G06F 16/9577
See application file for complete search history.

(56) References Cited

U.S. PATENT DOCUMENTS

| | | | | |
|---|---|---|---|---|
| 6,598,161 B1 * | 7/2003 | Kluttz | ................. | G06F 21/6209 713/166 |
| 8,543,907 B1 * | 9/2013 | Roskind | ................. | G06F 16/958 715/234 |
| 8,977,653 B1 * | 3/2015 | Mahkovec | ........ | G06F 17/30899 707/769 |
| 2003/0159030 A1 * | 8/2003 | Evans | ..................... | H04L 29/06 713/154 |
| 2005/0235163 A1 * | 10/2005 | Forlenza | ................. | H04L 9/088 713/193 |
| 2008/0018658 A1 * | 1/2008 | Bruno | ................. | G06F 16/9577 345/581 |
| 2008/0139191 A1 * | 6/2008 | Melnyk | ............. | G06F 17/30905 455/419 |
| 2012/0089664 A1 * | 4/2012 | Igelka | .................. | G06F 9/5083 709/203 |

(Continued)

*Primary Examiner* — Vivek Srivastava
*Assistant Examiner* — Muhammad Raza
(74) *Attorney, Agent, or Firm* — Banner & Witcoff, Ltd.

(57) ABSTRACT

Methods, systems, and computer-readable media for optimizing web pages using a rendering engine are presented. In some embodiments, a cloud service computing platform may receive, via a communication interface and from a user device, a request for a web page. Subsequently, the cloud service computing platform may retrieve, via the communication interface, and from a server, the web page. Further, the cloud service computing platform may render, using a headless browser, the web page to identify a plurality of content parts associated with the web page. Next, the cloud service computing platform may optimize the plurality of content parts associated with the web page. Additionally, the cloud service computing platform may transmit, via the communication interface and to the user device, the plurality of optimized content parts associated with the web page. Subsequently, the user device may render the plurality of optimized content parts associated with the web page.

20 Claims, 16 Drawing Sheets

(56) References Cited

U.S. PATENT DOCUMENTS

| | | | | |
|---|---|---|---|---|
| 2012/0173961 A1* | 7/2012 | Kirkby | ............... | G06Q 30/02 |
| | | | | 715/234 |
| 2012/0192080 A1* | 7/2012 | Lloyd | ............... | G06F 16/9577 |
| | | | | 715/744 |
| 2012/0265802 A1* | 10/2012 | Shen | ............... | H04L 67/02 |
| | | | | 709/203 |
| 2016/0086566 A1* | 3/2016 | Zhu | ............... | G06F 16/9577 |
| | | | | 345/428 |
| 2016/0092871 A1* | 3/2016 | Gordon | ............... | H04L 63/0414 |
| | | | | 705/44 |
| 2017/0329747 A1* | 11/2017 | Noursalehi | ............... | G06F 17/212 |

* cited by examiner

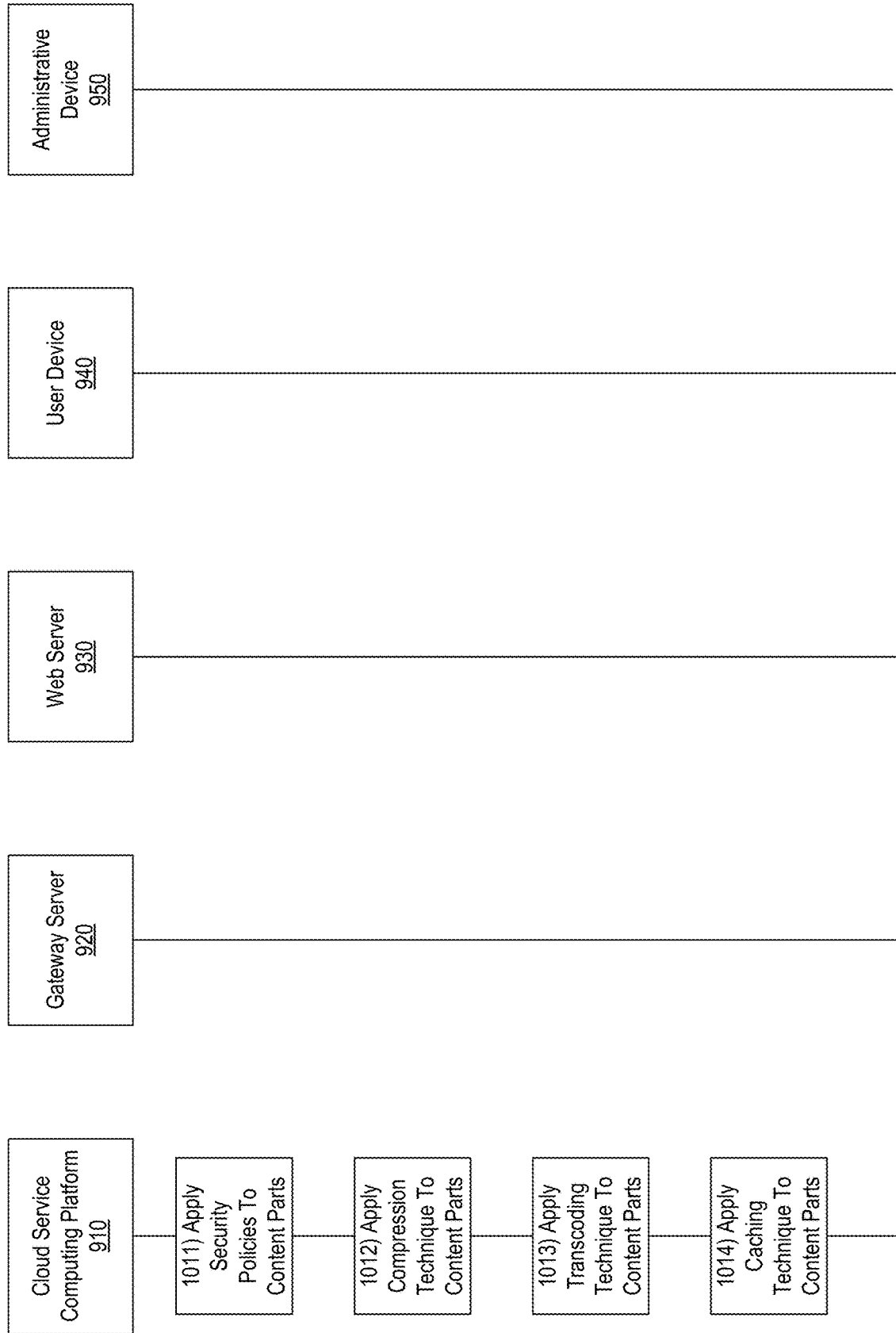

OPTIMIZING WEB APPLICATIONS USING A RENDERING ENGINE

FIELD

Aspects of the disclosure relate to computer hardware and software, digital processing systems, and multicomputer data transfer. In particular, one or more aspects of the disclosure relate to computer hardware and software for optimizing web applications using a rendering engine.

BACKGROUND

Enterprise organizations and their employees are increasingly using mobile computing devices to access web pages and/or web applications. As such mobile devices are increasingly adopted and used, it is increasingly important for organizations to optimize, control, and/or manage what information they can access so as to protect the safety and security of enterprise information and other enterprise resources. For example, enterprise organizations may use security policies to protect the safety and security of enterprise information and other enterprise resources by preventing the user device from accessing web pages and/or web applications. However, while certain content parts of the web pages may be harmful to the organization, other parts of the web page may be beneficial. In some instances, this may present technical challenges.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards optimizing web applications using a rendering engine.

In accordance with one or more embodiments, a computing platform having at least one processor, memory, and a communication interface may receive, by the at least one processor, via the communication interface, and from a user device, a request for a web page. Subsequently, the computing platform may retrieve, by the at least one processor, via the communication interface, and from a server, the web page. Thereafter, the computing platform may render, by the at least one processor and using a headless browser, the web page to identify a plurality of content parts associated with the web page. In addition, the computing platform may optimize, by the at least one processor, the plurality of content parts associated with the web page. Further, the computing platform may transmit, by the at least one processor, via the communication interface, and to the user device, the plurality of optimized content parts associated with the web page.

In some instances, the computing platform may launch, by the at least one processor, the headless browser in a container. Further, the rendering the web page to identify the plurality of content parts may be performed using the headless browser in the container. In some embodiments, the computing platform may receive, by the at least one processor, via the communication, and from the gateway server, optimization priorities. Subsequently, the optimizing the plurality of content parts associated with the web page may be based on the optimization priorities. In some examples, the plurality of content parts associated with the web page may comprise audio content, video content, text, images, static content, scripts, code, or cascading style sheets (CSS) associated with the web page.

In some instances, the computing platform may assign, by the at least one processor, a security priority to each of the plurality of optimized content parts associated with the web page. Subsequently, the transmitting the plurality of optimized content parts associated with the web page may be based on the security priority of each of the plurality of optimized content parts. In some embodiments, the computing platform may assign, by the at least one processor, a bandwidth priority to each of the plurality of content parts associated with the web page. Further, the optimizing the plurality of content parts may be based on the bandwidth priority.

In some examples, the optimizing the plurality of content parts associated with the web page may comprise applying a compression technique to the plurality of content parts associated with the web page. In some instances, the optimizing the plurality of content parts associated with the web page comprises transcoding the plurality of content parts associated with the web page. In some embodiments, the computing platform may cache, by the at least one processor, the plurality of content parts associated with the web page. Additionally, the computing platform may, in response to receiving a second request for the web page, reuse the cached plurality of content parts. In some examples, the plurality of optimized content parts associated with the web page may be rendered by the user device using a client rendering engine.

In some embodiments, the computing platform may store, by the at least one processor, the plurality of optimized content parts associated with the web page. Further, the computing platform may receive, by the at least one processor, via the communication interface, and from a second user device, a second request for the web page. Subsequently, the computing platform may retrieve, by the at least one processor, the stored plurality of optimized content parts associated with the web page. Additionally, the computing platform may transmit, by the at least one processor, via the communication interface, and to the second user device, the stored plurality of optimized content parts associated with the web page.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 10A-10E depict an example event sequence for optimizing web applications using a rendering engine in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
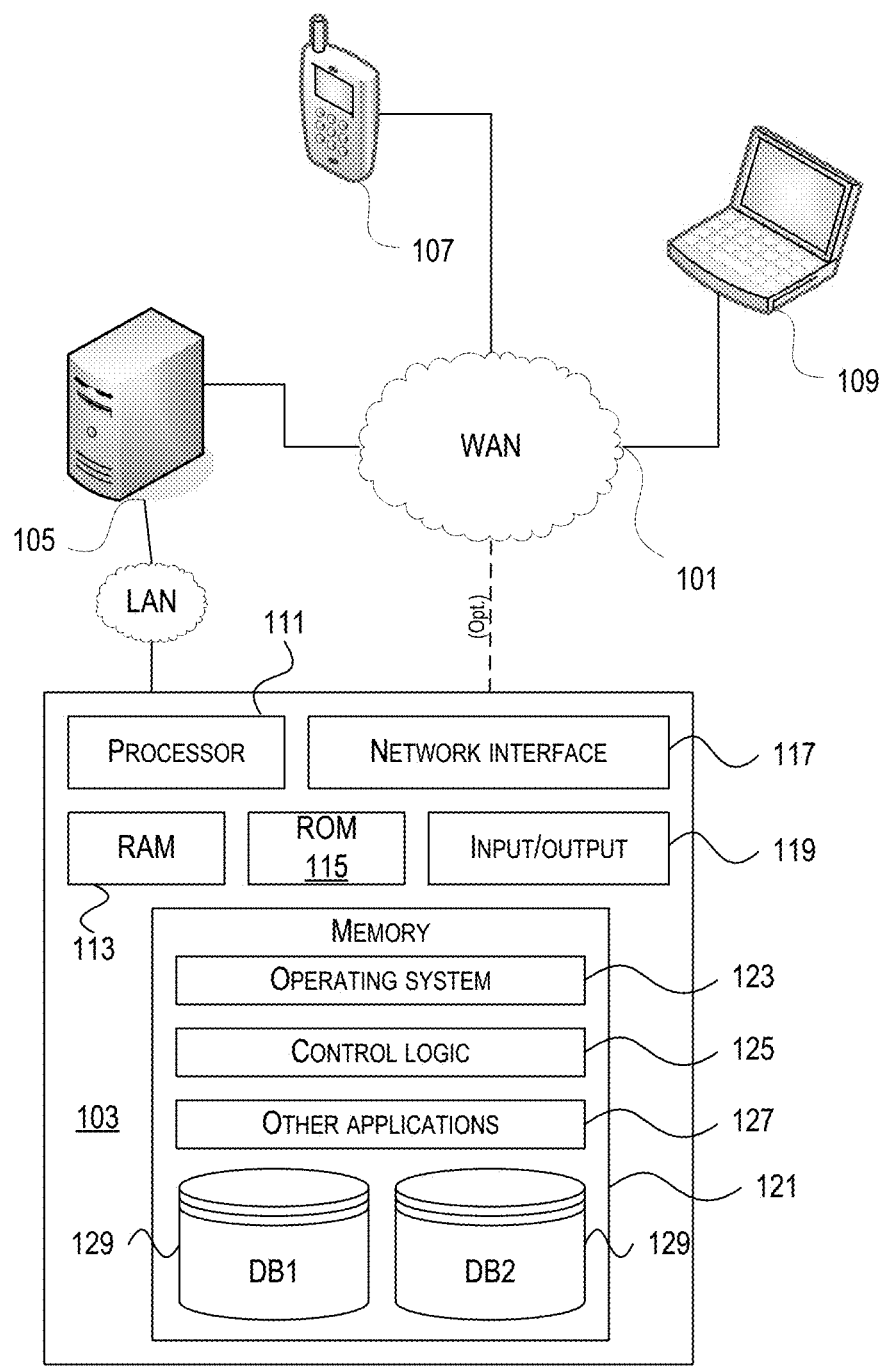
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
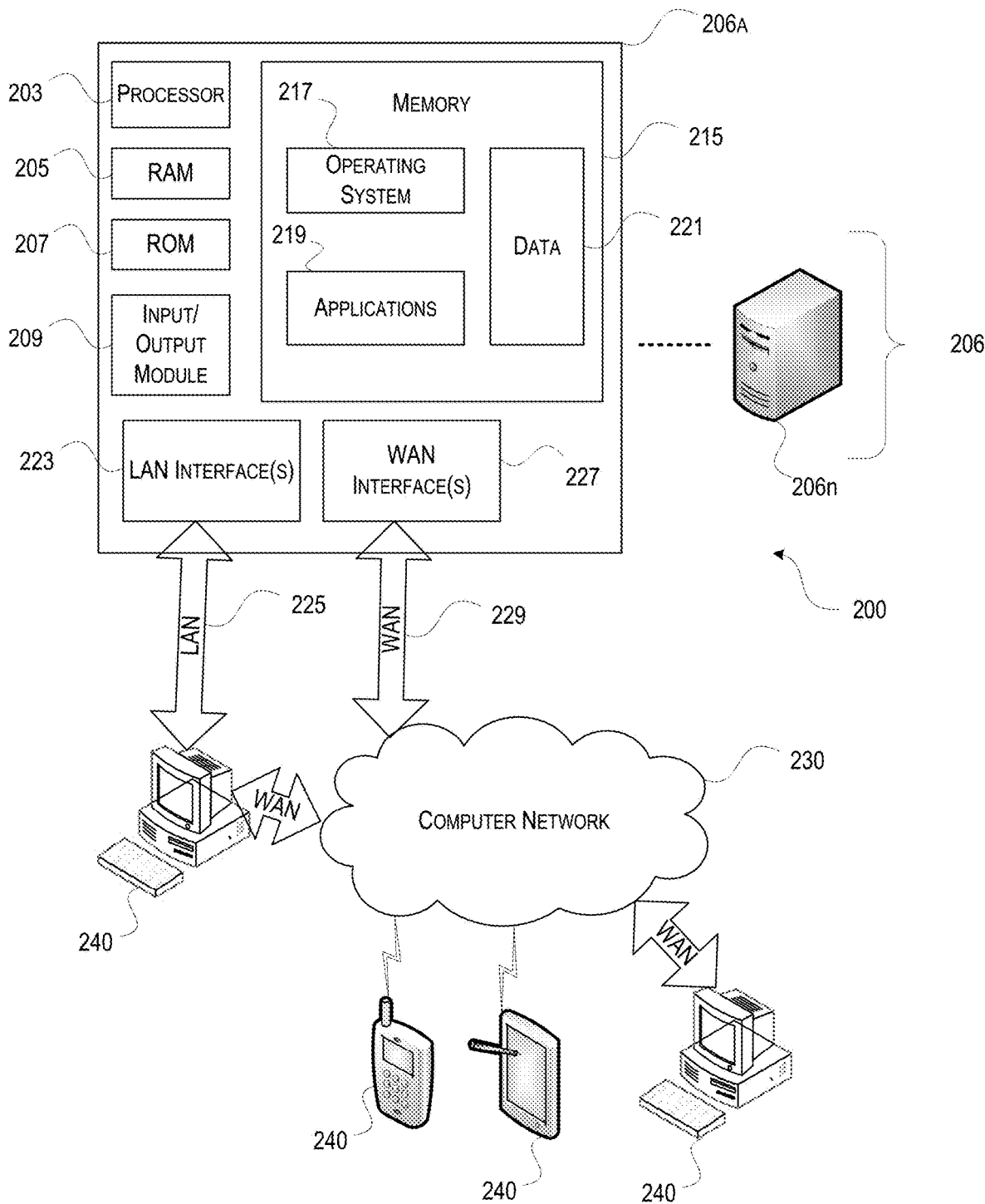
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
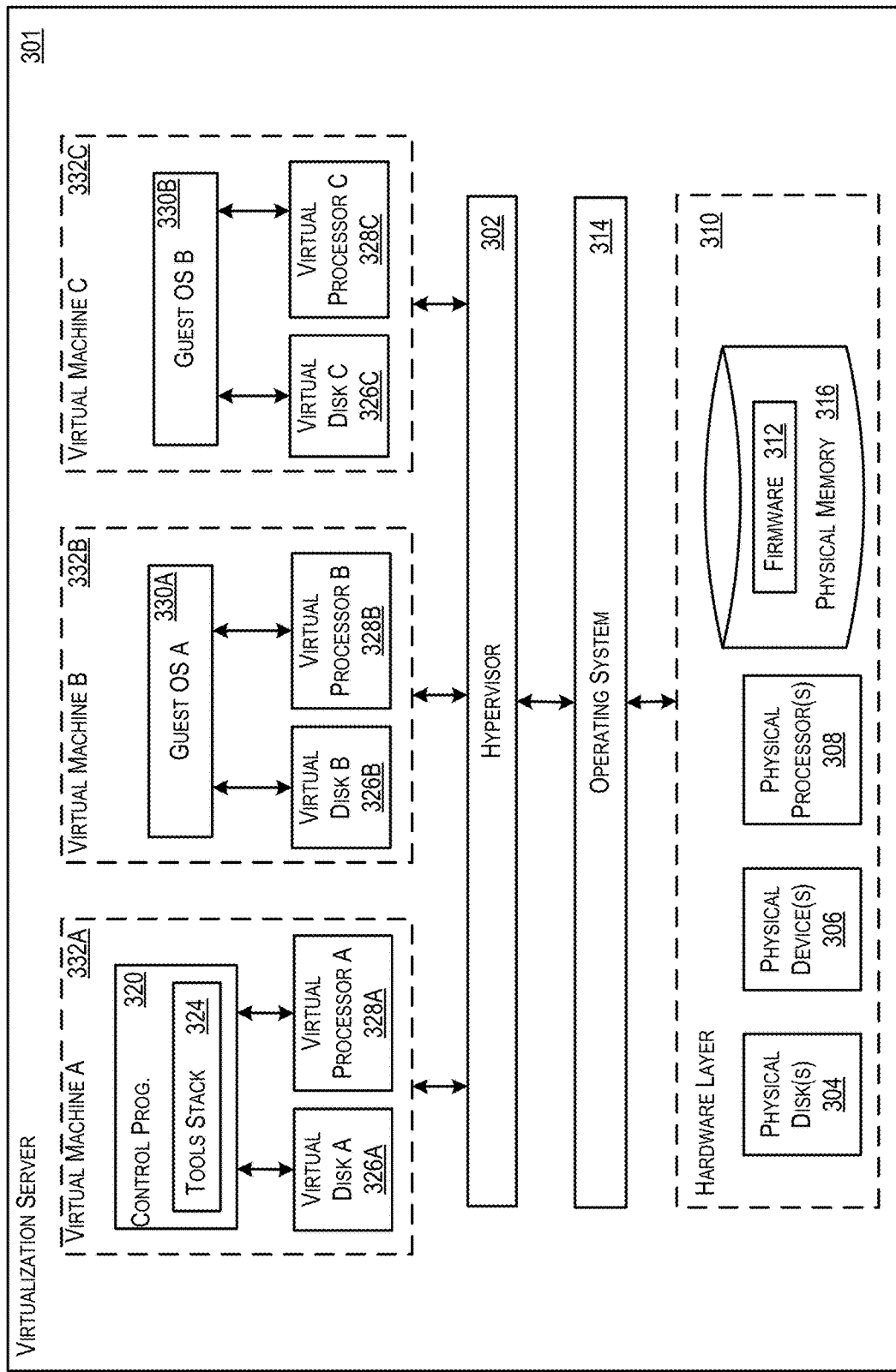
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
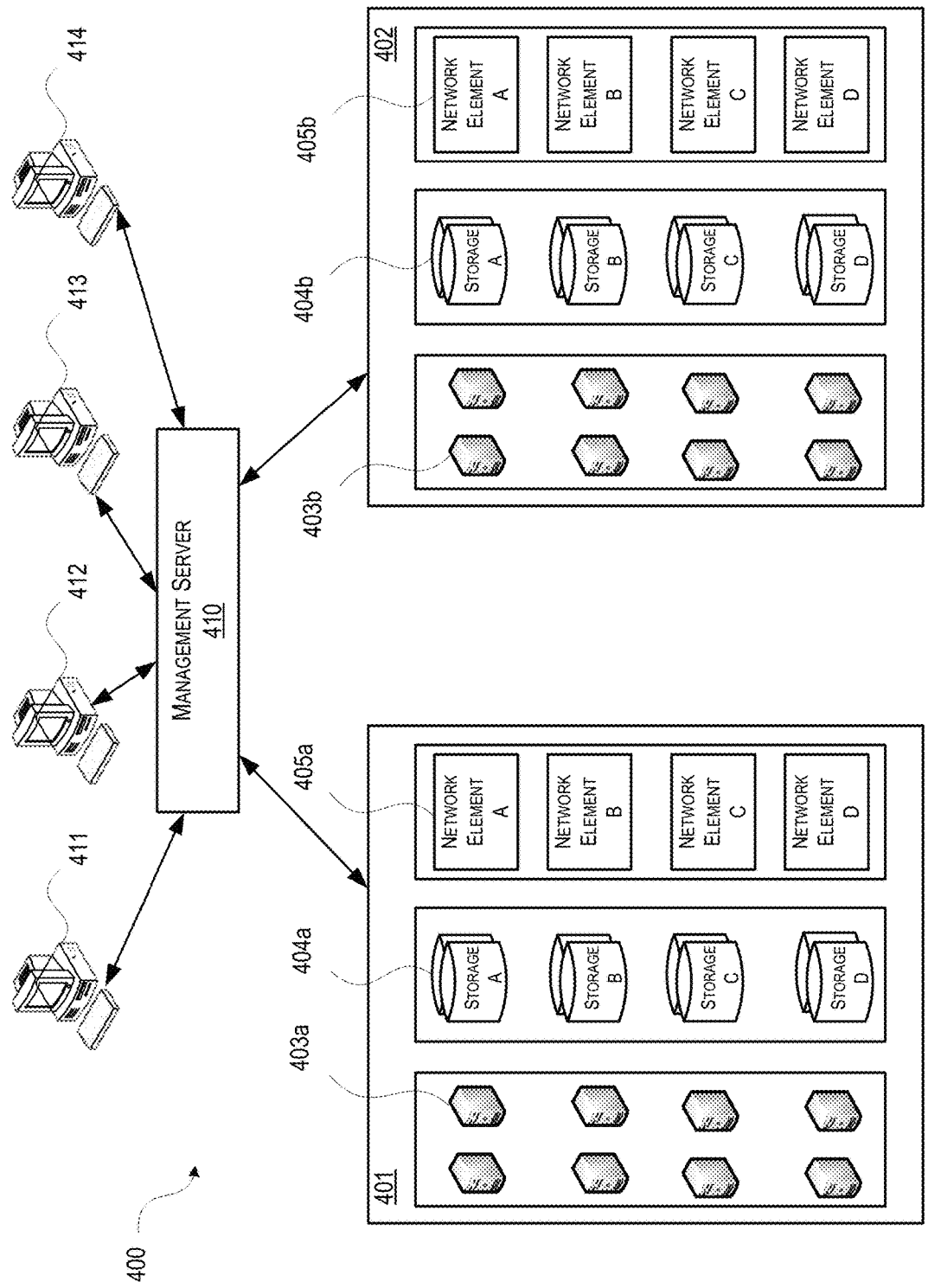
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
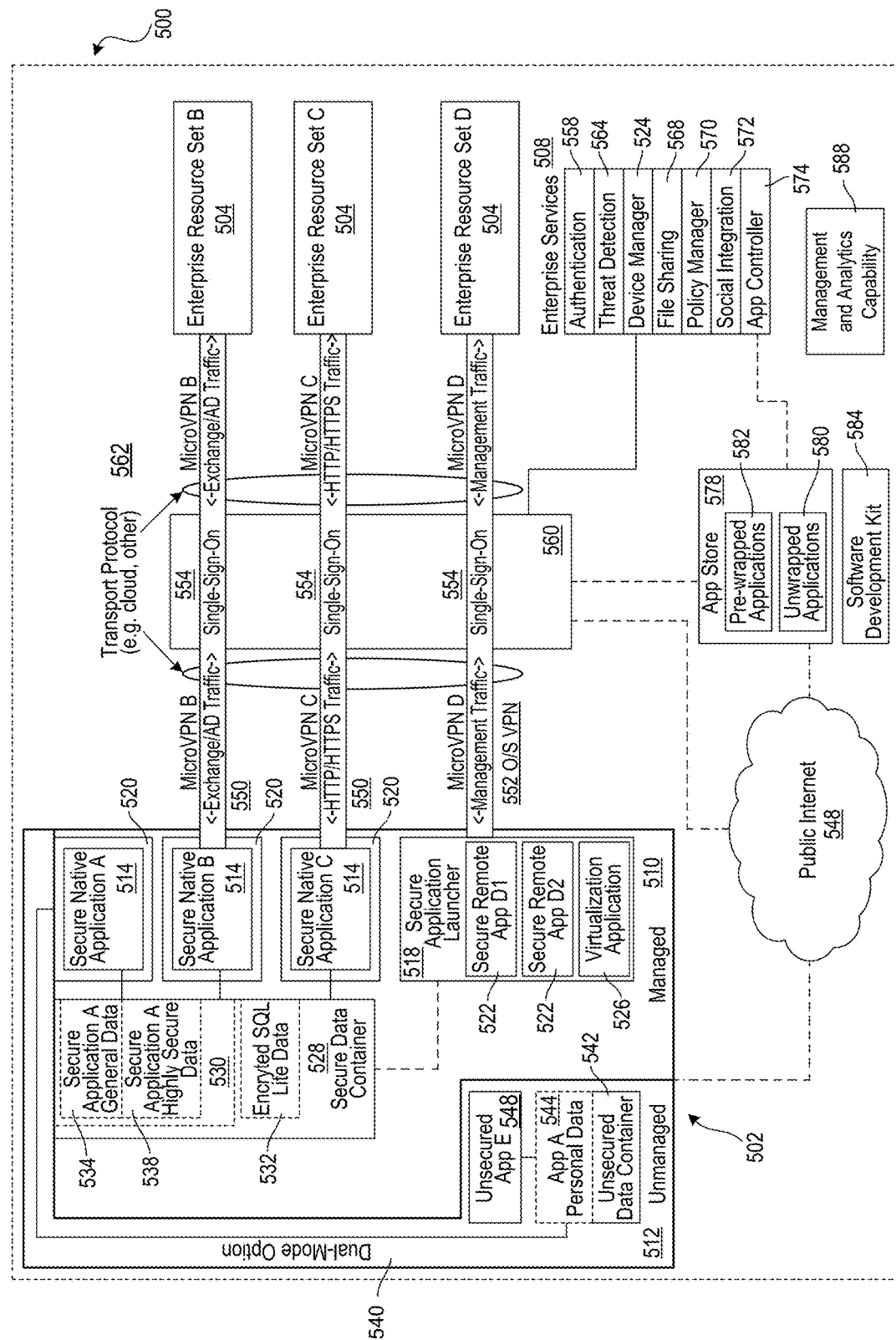
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications 550, particular devices, particular secured areas on the mobile device 552, and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
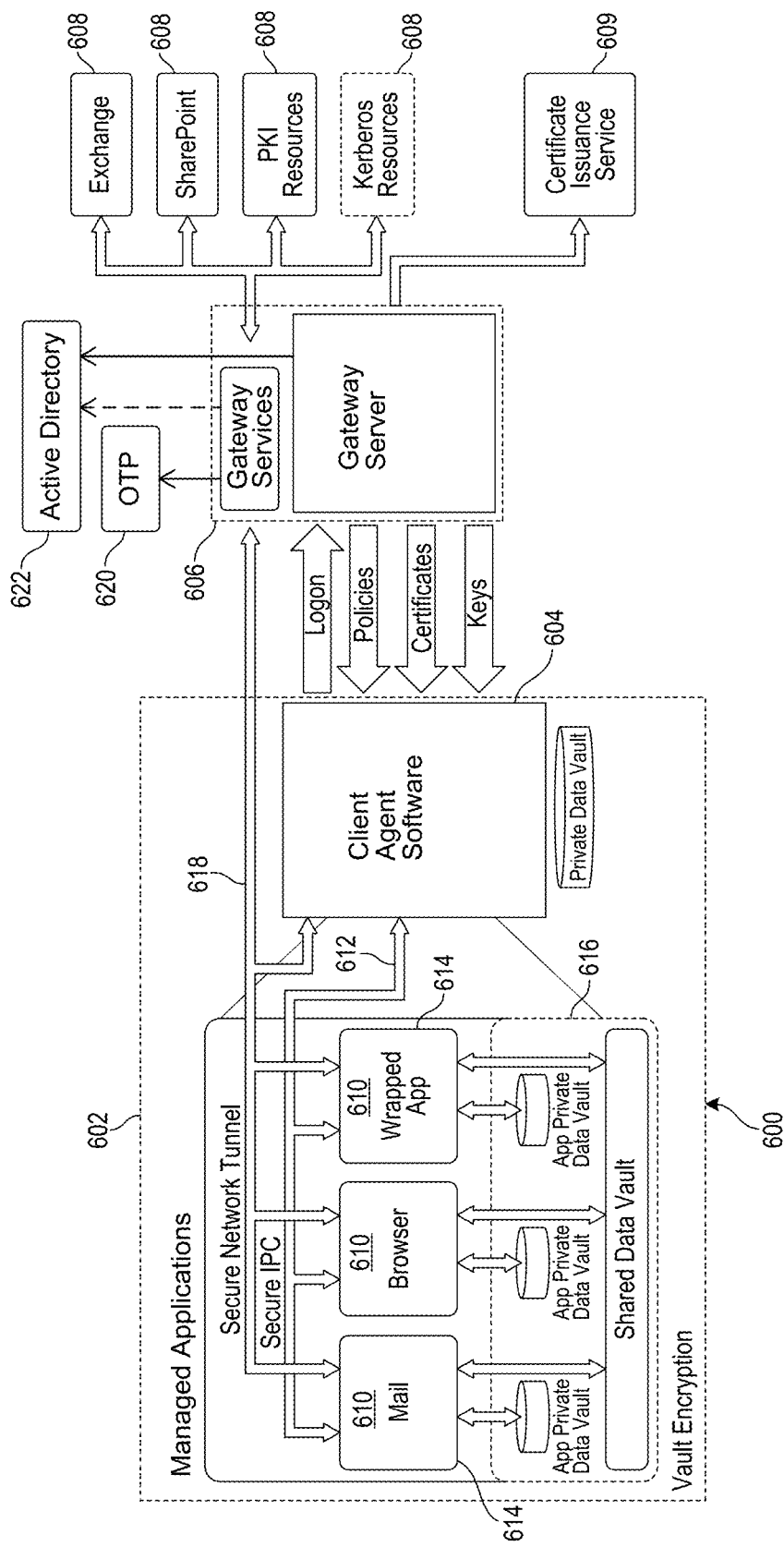
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Optimizing Web Applications Using a Rendering Engine

As discussed above, aspects of the disclosure relate to optimizing web applications using a rendering engine. In addition, one or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-6.

Figure 7:
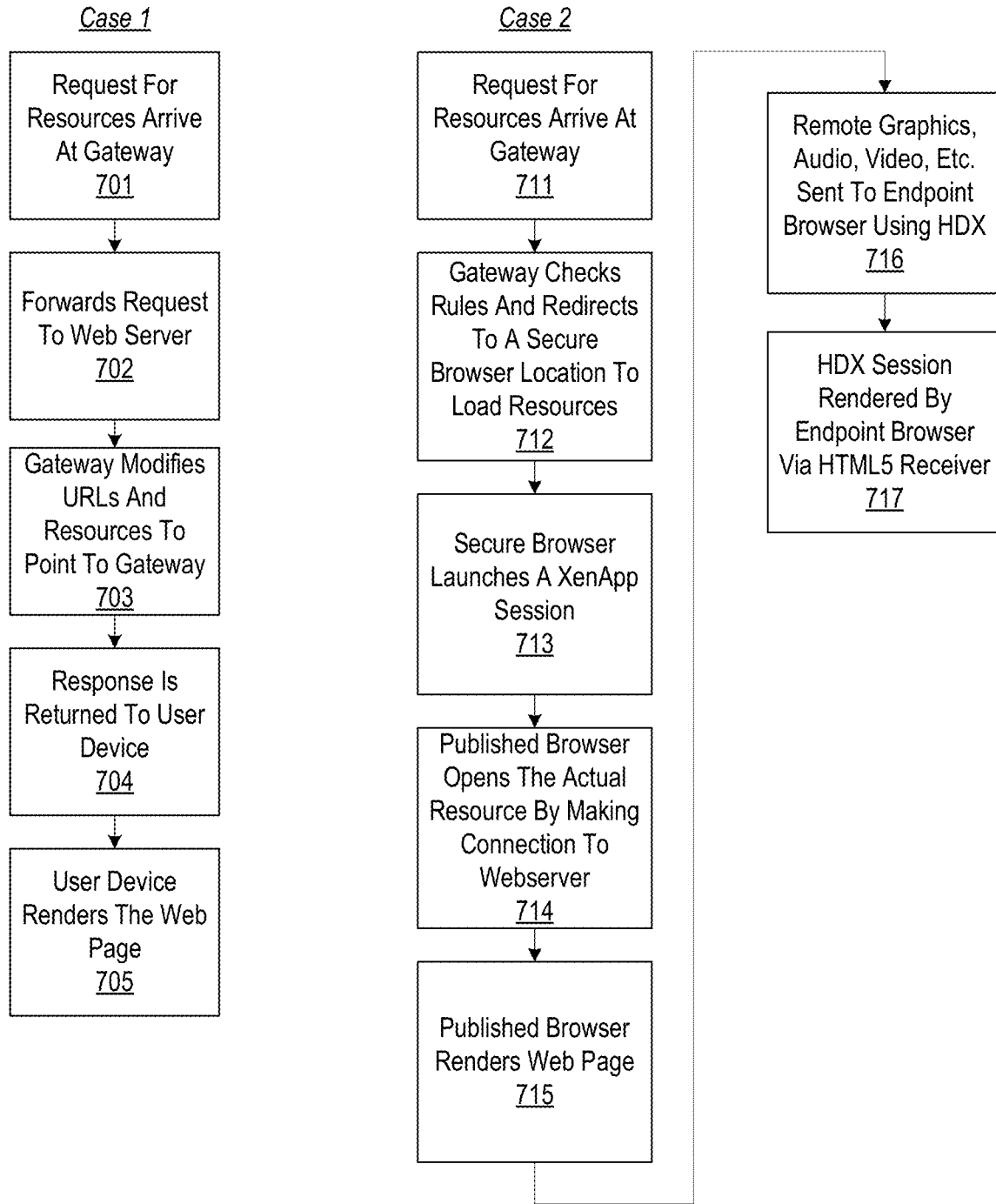
FIG. 7 depicts examples of optimizing web applications using a rendering engine in accordance with one or more illustrative aspects described herein.
Figure 8:
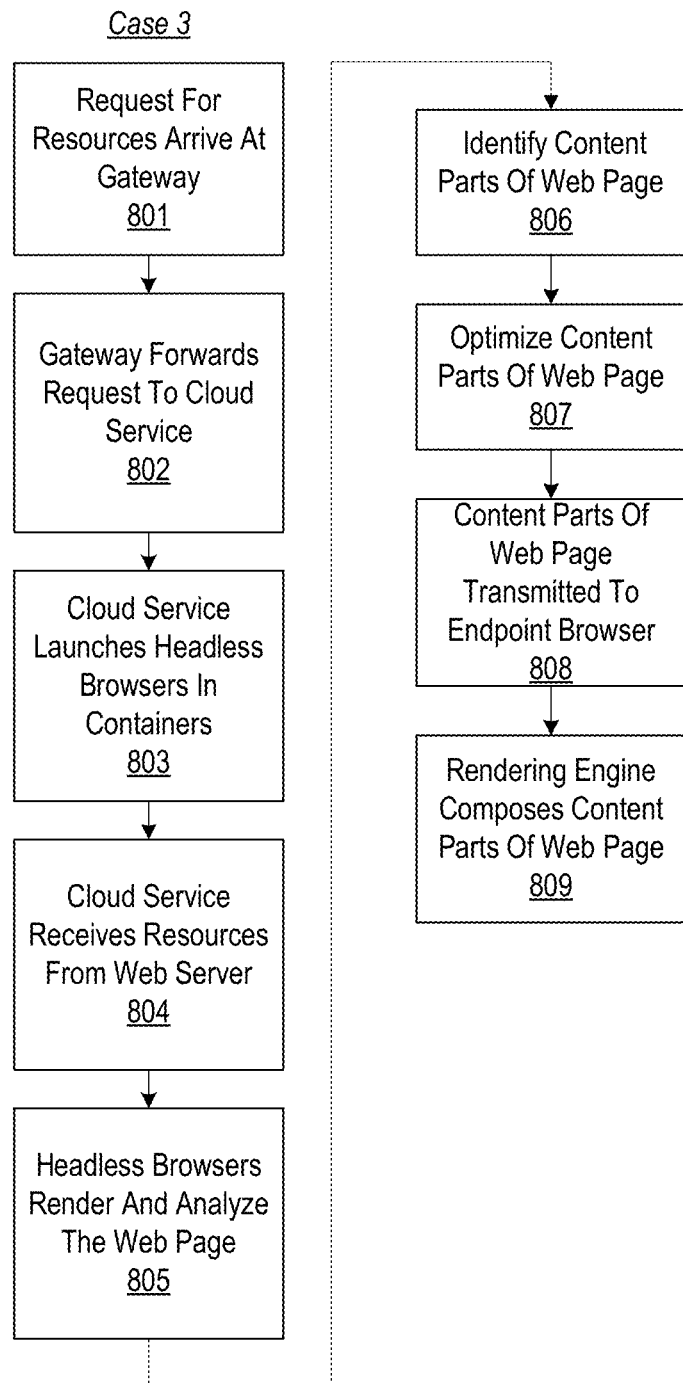
FIG. 8 depicts an example of optimizing web applications using a rendering engine in accordance with one or more illustrative aspects described herein.

FIGS. 7 and 8 depict examples of optimizing web applications using a rendering engine in accordance with one or more illustrative aspects described herein. Referring to FIG. 7, in a first example case, at step 701, a gateway server may receive a request for resources associated with a web page and/or a web application. For example, a user device may access a web page and/or a web application and request resources to load the web page and/or the web application. At step 702, the gateway server may forward the request to a web server. The web server may host the web page and/or the web application. At step 703, the gateway server may modify the uniform resource locators (URLs) and/or the resources associated with the web page and/or the web application to point to the gateway server rather than the web server. At step 704, the gateway server may transmit a response (e.g., the modified URLs and/or the resources) associated with the request to the user device. At step 705, after receiving the response, the user device may render the web page and/or the web application.

In a second example case, at step 711, a gateway server may receive a request, from a user device, for resources associated with a web page and/or a web application. At step 712, the gateway server may check the rules and/or policies associated with an enterprise organization to determine whether to redirect the request to a secure browser location to load the resources. At step 713, the secure browser may launch an application virtualization session (e.g., a XenApp session) and/or a virtual desktop session (e.g., a XenDesktop session). At step 714, the published browser may open the actual resource by making a connection to a webserver. For example, the XenApp session may open a published browser. The published browser may request and receive resources associated with the web page and/or the web application from the web server. At step 715, after receiving the resources, the published browser may render the web page and/or the web application. At step 716, the remote graphics, audio, video, and other parts associated with the web page and/or the web application may be sent, using high-definition user experience (HDX) technology, to the endpoint browser. The endpoint browser may be on the user device requesting the resources. At step 717, the HDX session may be rendered by the endpoint browser via a HTML5 Receiver.

Referring to FIG. 8, in a third example case, at step 801, a gateway server may receive a request, from a user device, for resources associated with a web page and/or a web application. At step 802, the gateway server may forward the request to a cloud service computing platform. At step 803, the cloud service computing platform may launch headless browsers in dockers or containers. At step 804, the cloud service computing platform may request and receive resources associated with the web page and/or the web application from a web server. At step 805, the headless browsers may render and analyze the web page and/or the web application. After rendering and analyzing the web page, at step 806, the cloud service computing platform may identify content parts of the web page and/or the web application. For example, the content parts may include audio, video, text, images, static content and/or code associated with the web page and/or the web application. At step 807, the cloud service computing platform may optimize the content parts of the web page and/or the web application. After optimizing the content parts, at step 808, the content parts may be transmitted to an endpoint browser at the user device. At step 809, the user device may use a rendering engine to compose the received content parts and display the web page and/or web application.

Figure 9:
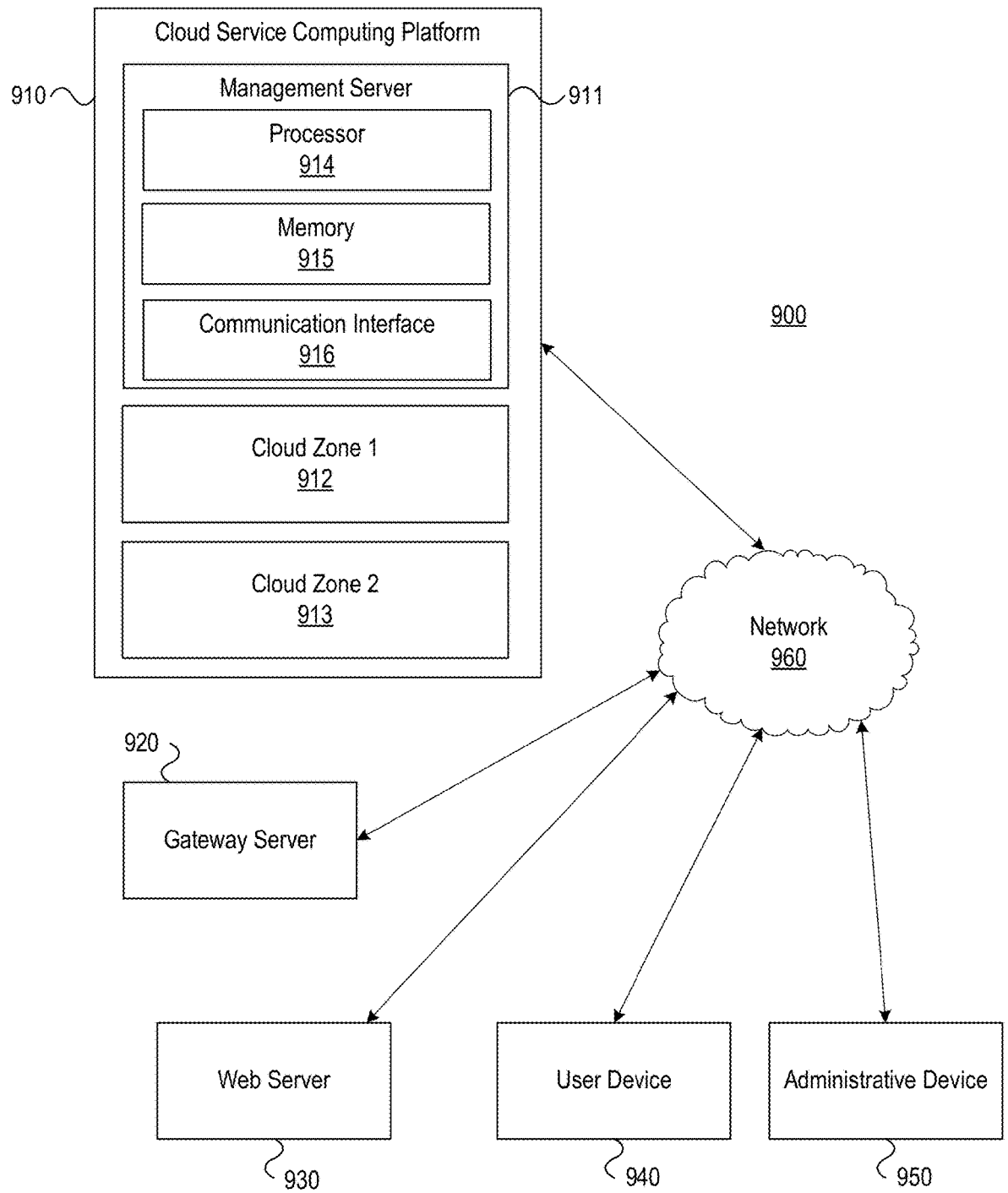
FIG. 9 depicts an illustrative computing environment for optimizing web applications using a rendering engine in accordance with one or more illustrative aspects described herein.

FIG. 9 depicts an illustrative computing environment for optimizing web applications using a rendering engine in accordance with one or more illustrative aspects described herein. Referring to FIG. 9, computing environment 900 may include a cloud service computing platform 910, a gateway server 920, a web server 930, a user device 940, an administrative device 950, and a network 960. Cloud service computing platform 910, gateway server 920, web server 930, user device 940, and administrative device 950 may include one or more physical components, such as one or more processors, memories, communication interfaces, and/or the like.

Cloud service computing platform 910 may incorporate one or more aspects of cloud computing environment 400. For example, the cloud service computing platform 910 may include a management server 911, which may incorporate one or more aspects of management server 410. In addition, the cloud service computing platform 910 may provide one or more cloud zones (e.g., first cloud zone 912, second cloud zone 913), which may incorporate one or more aspects of the cloud zones 401 or 402 discussed above. Further, the cloud service computing platform 910 may provide one or more containers to run headless browsers as described in greater detail below. For example, the management server 911 may launch, and/or establish one or more software containers to host one or more headless browsers. The software containers may be launched within the cloud zones (e.g., first cloud zone 912 and/or second cloud zone 913). In addition, in some examples, the cloud service computing platform 910 may include a rendering engine. The rendering engine, as explained in further detail below, may render a web page and/or web application.

Gateway server 920 may incorporate one or more aspects of gateway server 606. For example, as explained above, gateway server 920 may access various enterprise resources 608 and services 609 such as Exchange, Sharepoint, public-key infrastructure (PKI) Resources, Kerberos Resources, Certificate Issuance service. Web server 930 may incorporate one or more aspects of web server 105 and/or data server 103. User device 940 may be a mobile device 502 and/or a client device (e.g., client device 107). For example, from user device 940, a user may request resources from the web server 930 using an Internet browser, as is known in the art, or by executing a software application that communicates with web server 930 over a computer network (e.g., network 960). Additionally, in some examples, the user device 940 may include a rendering engine. The rendering engine, as explained in further detail below, may render a web page and/or web application. An administrative device 950 may be associated with an enterprise organization and may send and receive information (e.g., policies and/or bandwidth priorities) to the other computing devices of computing environment 900.

Network 960 may include one or more wide area networks and/or local area networks and may interconnect one or more systems and/or devices included in computing environment 900. For example, network 960 may interconnect cloud service computing platform 910, gateway server 920, web server 930, user device 940, and administrative device 950.

Management server 911 may include processor 914, memory 915, and communication interface 916. Management server 911 may be included in the cloud service computing platform 910. Processor 914 may execute instructions stored in memory 915 to cause management server 911 to perform one or more functions, such as optimizing web applications using a rendering engine. Communication interface 916 may include one or more network interfaces via which management server 911 may communicate with one or more other systems and/or devices in computing environment 900, such as cloud service computing platform 910, gateway server 920, web server 930, user device 940, and administrative device 950.

Figure 10A:
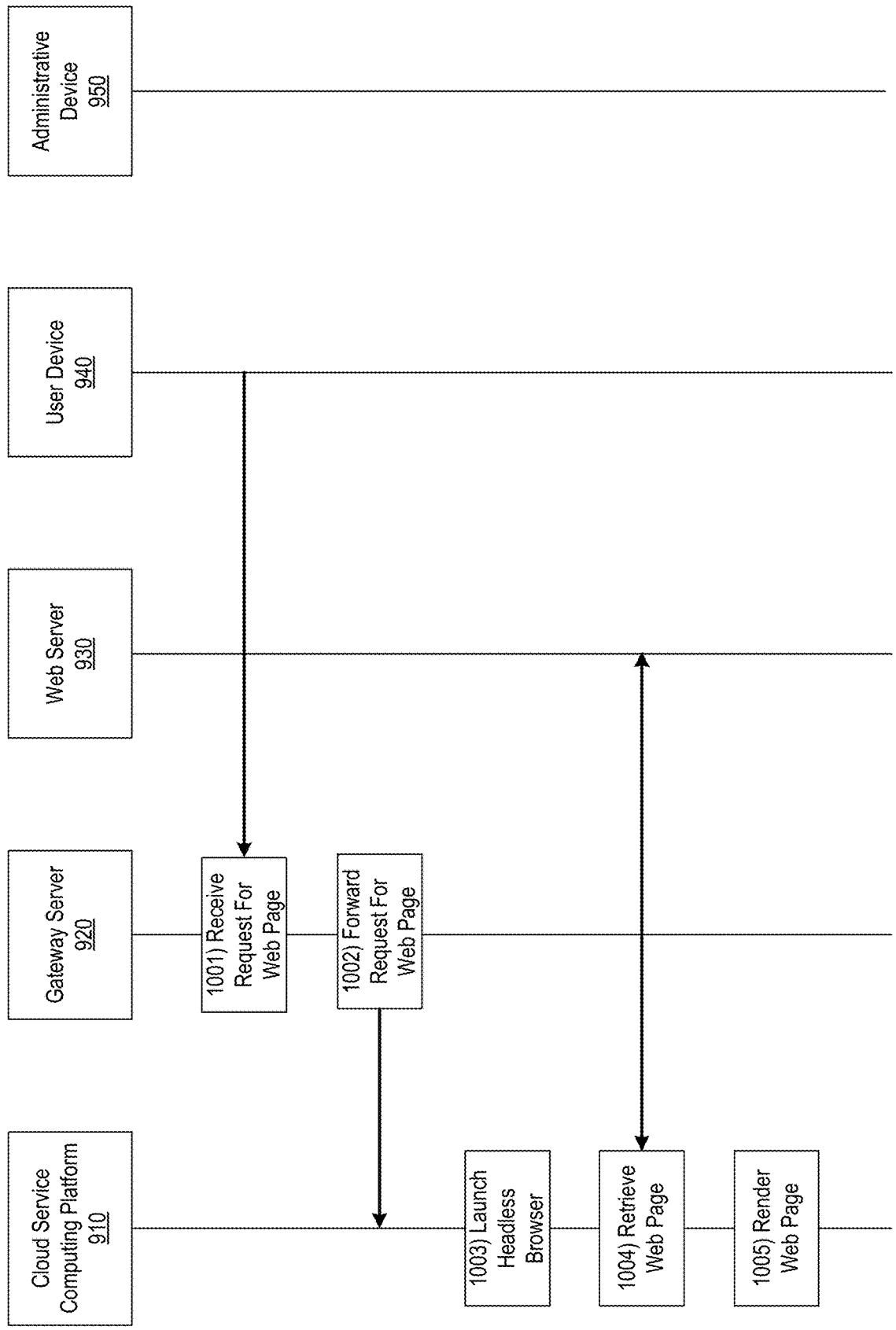

FIGS. 10A-10E depict an example event sequence for optimizing web applications using a rendering engine in accordance with one or more illustrative aspects described herein. Referring to FIG. 10A, at step 1001, a gateway server 920 may receive a request for a web page and/or a web application. For example, a user may browse the internet using the user device 940. The user may access a web page and/or web application. The web application may be a software as a service (SaaS) application. In order to display the web page and/or web application on the user device 940, the user device 940 may transmit a request for resources associated with the web page and/or web application. The gateway server 920 may receive and/or intercept the request for resources associated with the web page and/or web application.

In some instances, the user device 940 may be associated with an enterprise organization. For example, the user device 940 may be provided by the enterprise organization and/or a user's own user device based on a "Bring Your Own Device" (BYOD) model. The user device 940 may be accessing the network 960 using a network connection provided by the enterprise organization.

In step 1002, the gateway server 920 may forward the request for resources associated with the web page and/or the web application to a cloud service computing platform 910. The request for resources may include a document, such as an HTML file, associated with the web page and/or web application. In some instances, the gateway server 920 (e.g., NETSCALER gateway) may be associated with the enterprise organization. In some examples, the gateway server 920 may block the request for resources associated with the web page and/or web application. For example, the enterprise organization might determine a web page and/or web application is harmful and block the web page and/or web application. The gateway server 920 might not forward the request to the cloud service computing platform 910. Instead, the gateway server 920 may block the request and the process may end.

Figure 11:
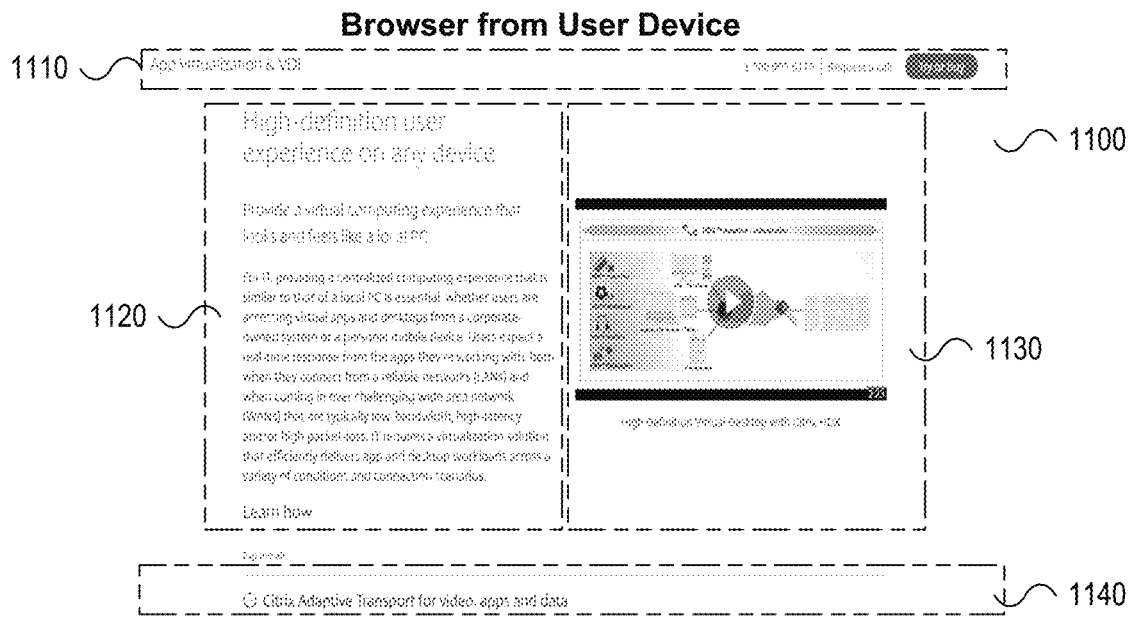
FIG. 11 depicts an example graphical user interface for optimizing web applications using a rendering engine in accordance with one or more illustrative aspects described herein.
Figure 12:
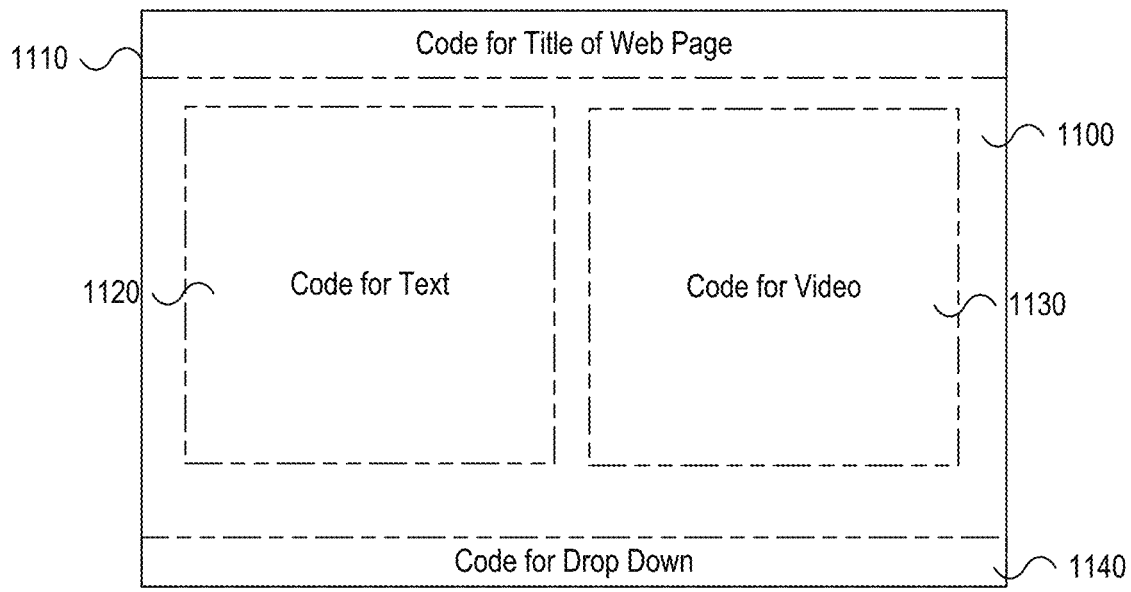
FIG. 12 depicts an example graphical user interface for optimizing web applications using a rendering engine in accordance with one or more illustrative aspects described herein.

In step 1003, the cloud service computing platform 910 may launch a headless browser. For example, either prior to or after receiving the request from the gateway server 920, the cloud service computing platform 910 may launch one or more headless browsers. The management server 911 may respond to the user's request and may allocate the resources to create one or more software containers using resources in cloud zones (e.g., first cloud zone 912 or second cloud zone 913). After creating the one or more containers, the management server 911 may launch the one or more headless browsers in the one or more software containers. The software containers may be a docker. The headless browser may be a web browser without a graphical user interface and may include a rendering engine to render the web page and/or web application. Rather than displaying the graphical user interface of endpoint web browsers, the headless browser may display code associated with content from the web page. For example, FIGS. 11 and 12 depict example graphical user interfaces for a browser and a headless browser. In particular, FIG. 11 depicts an example graphical user interface for a web page 1100 on a user device (e.g., user device 940). The web browser may render the web page 1100 and/or web application and display content parts of the web page 1100. A user may use the web browser to interact with different content part of the web page 1100 (e.g., title of web page 1110, text of web page 1120, video of web page 1130, and drop down feature of web page 1140). In another example, FIG. 12 may display a headless browser in a cloud service computing platform (e.g., cloud service computing platform 910) rendering a web page 1100. Since a headless browser might not have a graphical user interface, the content parts of web page 1100 may be displayed in code. For example, the video of the web page 1130 in FIG. 11 may be displayed as code for the video of the web page 1130 in FIG. 12.

In step 1004, the cloud service computing platform 910 may retrieve the web page and/or web application from web server 930. For example, the web server 930 may host the web page and/or web application requested by the user device 940. The cloud service computing platform 910 may parse the document (e.g., html file) associated with the web page and/or web application to determine resources and/or files (e.g., images, cascading style sheets [CSS], JavaScript [JS]) referenced by the web page and/or web application. After parsing the request, the cloud service computing platform 910 may request and receive the resources and/or files associated with the web page and/or web application.

In some examples, in step 1002, the gateway server 920 may request resources associated with the web page and/or web application from the web server 930. For example, an administrator, using an administrative device 950, may transmit a command to forward requests for web pages and/or web applications directly to the web server 930. In such examples, the gateway server 920 may forward the request to the web server 930. After receiving the request, the web server 930 may transmit the requested resources and/or files associated with the web page and/or web application to systems and/or devices in computing environment 900, such as cloud service computing platform 910, gateway server 920, user device 940, and/or administrative device 950.

After receiving the resources associated with the web page and/or web application, in step 1005, the cloud service computing platform 910 may render the web page and/or web application. For example, the cloud service computing platform 910 may build the web page (e.g., web page 1100) and/or web application using the received resources associated with the web page and/or web application. After building the web page and/or web application, the cloud service computing platform 910 may render the web page and/or web application. In some embodiments, a Citrix rendering engine, within the headless browser, may be used to render the web page and/or web application.

In some instances, rather than launching a secure browser in a virtual application session (e.g., a XenApp session) or a virtual machine desktop (e.g., a XenDesktop session), the cloud service computing platform 910 may launch a headless browser in a container to render the web page and/or web application. Rather than launching a remote session, using a docker or container to render and analyze the web page and/or web application may conserve resources on the server side. For example, dockers or containers may require less physical hardware than a remote session (e.g., a XenApp or XenDesktop session).

In some examples, the cloud service computing platform 910 may monitor and/or manage cloud storage for many different enterprise organizations. Enterprise organizations may frequently use certain web pages and/or web applications (e.g., SaaS applications). The web pages and/or web applications may be web pages and/or web applications associated with and/or managed by the enterprise organization. Launching a remote session each time a user device (e.g., user device 940) requests a frequently used web page and/or web application may prove to be excessive. Thus, in such examples, a docker or container may be used to conserve resources. In addition, the cloud service computing platform 910 may assign cloud storage to particular enterprise organizations. The enterprise organizations may use their assigned cloud storage to launch dockers or containers for web pages and/or web applications. For example, an enterprise organization may frequently use a web application. The cloud service computing platform 910 may launch, monitor, and/or maintain the web application in the docker or container even after responding to the request for the web application from user device 940. Thus, as explained in more detail below, if the cloud service computing platform 910 receives another request for the web application, the cloud service computing platform 910 may use machine learning to optimize the response to the request for the web application.

Figure 10B:
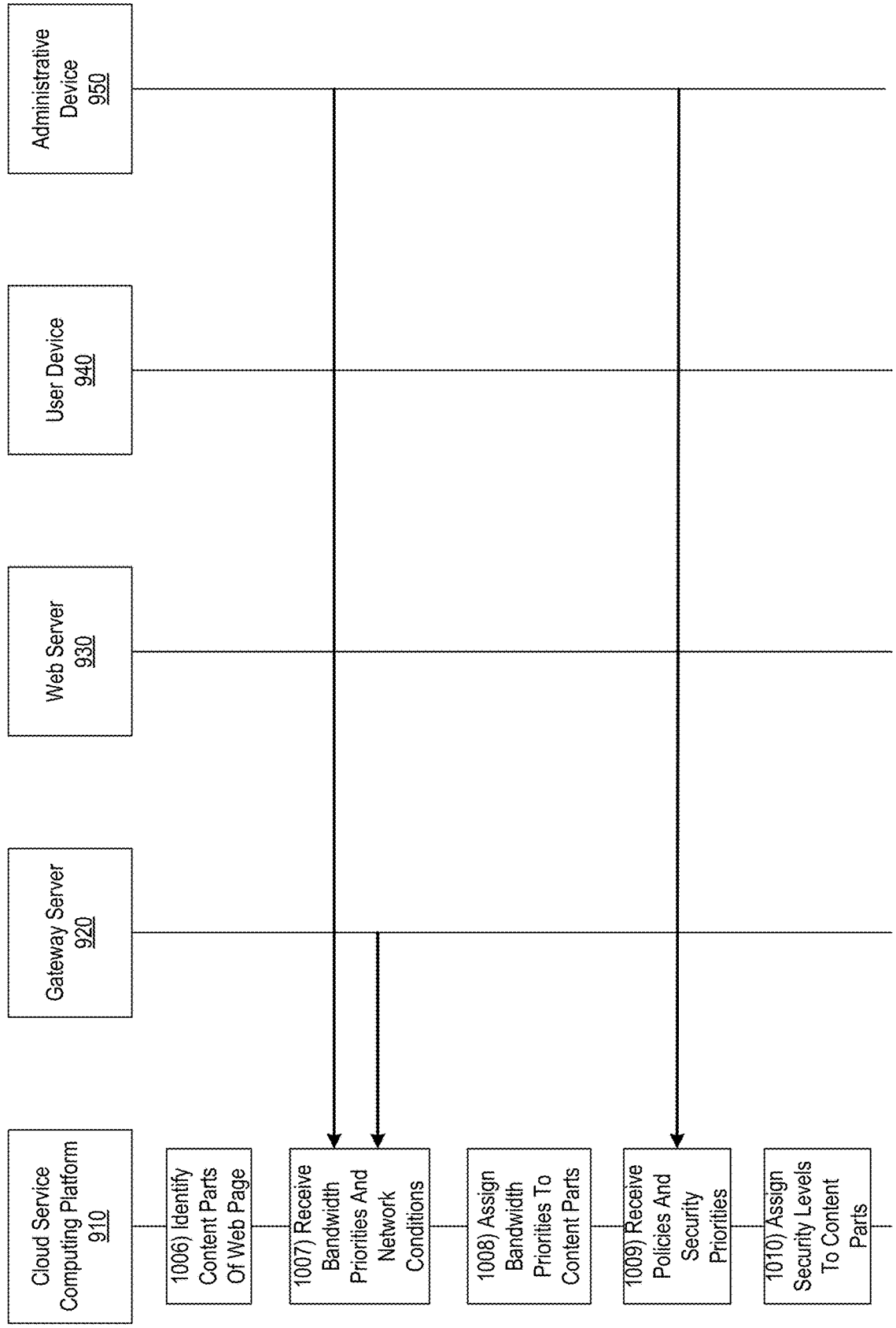

Referring to FIG. 10B, in step 1006, the cloud service computing platform 910 may identify content parts of the web page and/or web application. The content parts of the web page and/or web application may include audio, video, text, images, static content, advertisement content, JS, CSS, plugins, and/or code associated with the web page and/or web application. For example, after rendering the web page and/or web application in step 1005, the cloud service computing platform 910 may identify the content parts and/or content sections of the web page and/or web application. Referring back to FIG. 12, the headless browser may render the web page and/or web application (e.g., title of web page 1110, text of web page 1120, video of web page 1130, and drop down feature of web page 1140). Afterwards, the cloud service computing platform 910 may analyze the web page and/or web application to identify content sections and/or content parts associated with the web page and/or web application. For example, as shown in FIG. 12, the identified content sections and/or content parts may be displayed in code form rather than being displayed using a graphical user interface. The cloud service computing platform 910 may analyze the code to determine different content parts and/or content sections associated with the web page and/or web application. The cloud service computing platform 910 may identify a content part for the title of the web page 1110, a content part for the text of the web page 1120, a content part for the video of the web page 1130, and/or a content part for the drop down feature of the web page 1140. Further, the cloud service computing platform 910 may identify JS, CSS, and/or code associated with the web page 1100 that may allow the web page 1100 run properly on a user device 940.

In step 1007, the cloud service computing platform 910 may receive bandwidth priorities and network conditions. For example, the cloud service computing platform 910 may receive the bandwidth priorities from the administrative device 950 and/or receive network conditions from the gateway server 920. In some instances, the gateway server 920 may receive the bandwidth priorities from the administrative device 950 and then forward the bandwidth priorities to the cloud service computing platform 910. The bandwidth priorities may include an enterprise organization's priorities on different content parts and/or content sections associated with the web page and/or web application. For example, the enterprise organization may assign a higher priority to content parts associated with video files and/or text files. The enterprise organization may assign a lower priority to titles of the web page and/or advertisement sections. In some examples, the enterprise organization may assign priorities for specific web pages and/or web applications (e.g., the enterprise organization's web pages and/or web applications). For example, the enterprise organization may frequently use certain web pages and/or web applications. The enterprise organization may assign priorities for the frequently used web pages and/or web applications.

In some embodiments, the cloud service computing platform 910 may receive a network condition (e.g., network latency, jitter, packet loss, and/or network interference) associated with network 960 from the gateway server 920. For example, the cloud service computing platform 910 and/or the gateway server 920 may encounter network problems when transmitting the content parts and/or content sections of the web page and/or web application to the user device 940. The network problems may be caused by network conditions, such as network latency, jitter, packet loss, and/or network interference, associated with the network 960. The gateway server 920 may determine the network conditions causing the network problems and transmit the network conditions to the cloud service computing platform 910.

After receiving the bandwidth priorities, in step 1008, the cloud service computing platform 910 may assign the priorities to different content sections and/or content parts of the web page (e.g., assigning a high priority to a video section of the web page 1130 and assigning a low priority to a title section of the web page 1110). The cloud service computing platform 910 may determine, based on the assigned bandwidth priorities, the content parts to transmit to the user device 940. In some examples, the cloud service computing platform 910 and/or the gateway server 920 may determine the bandwidth and/or the network conditions for the network 960 may be insufficient to transfer the web page and/or the web application to the user device 940. In such examples, the cloud service computing platform 910 may determine a threshold number based on the bandwidth conditions of the network 960. If the assigned priorities for the content sections and/or content parts is greater than the threshold number, the cloud service computing platform 910 may transmit the content sections and/or content parts to the user device 940. If the assigned priorities for the content sections and/or content parts is less than the threshold number, the cloud service computing platform 910 might not send the content parts and/or content sections. In some instances, the cloud service computing platform 910 may delay sending the content parts and/or content sections until the bandwidth conditions of the network 960 improve. In some embodiments, the administrative device 950 may direct the cloud service computing platform 910 to transmit the content parts and/or content sections to the user device 940 in segments. For example, content parts and/or content sections associated with the highest level bandwidth priority may be transmitted first to the user device 940. Next, the content parts and/or content sections associated with second highest level bandwidth priority may be transmitted to the user device 940 and so on.

In some examples, the cloud service computing platform 910 may perform an optimization technique (e.g., a compression technique, a transcoding technique, and/or a caching technique), as explained below, based on the assigned bandwidth priorities. For example, the cloud service computing platform 910 may determine a threshold level based on the received bandwidth priorities. If the assigned bandwidth priorities for the content sections and/or content parts is greater than the threshold level, the cloud service computing platform 910 may perform the optimization technique. If it is lower, the cloud service computing platform 910 might not perform the optimization technique.

In some embodiments, the cloud service computing platform 910 may perform an optimization technique (e.g., a compression technique, a transcoding technique, and/or a caching technique), as explained below, based on the network conditions. For example, the cloud service computing platform 910 and/or the gateway server 920 may determine network problems caused by the conditions of network 960. Based on the determined network conditions, the cloud service computing platform 910 may perform an optimization technique, such as a compression technique, on one or more content parts and/or content sections of the web page and/or web application.

In some examples, the cloud service computing platform 910 may perform an optimization technique (e.g., a compression technique, a transcoding technique, and/or a caching technique), as explained below, based on user device capabilities. For example, the cloud service computing platform 910 may determine the device capabilities of the user device 940. Based on the device capabilities, the cloud service computing platform 910 may perform an optimization technique, such as a transcoding technique.

In step 1009, the cloud service computing platform 910 may receive policy files and/or security priorities from the administrative device 950. In some examples, the gateway server 920 may receive the policy files and/or security priorities from the administrative device 950 and the gateway server 920 may forward the policy files and/or security priorities to the cloud service computing platform 910 and/or user device 940. The policies, as explained above, may be implemented through a firewall or gateway (e.g., gateway server 920) in such a way that the user device 940 may be identified, secured or security verified, and provided selective or full access to the enterprise resources (e.g., 504 and 508). The policies may be mobile device management policies, mobile application management policies, mobile data management policies, or some combination of mobile device, application, and data management policies. The policies and/or security priorities may be set by an administrative device 950 associated with an enterprise organization.

In step 1010, the cloud service computing platform 910 may assign security levels to the different content parts of the web page and/or web application. For example, the cloud service computing platform 910 may assign security levels based on the received policies and/or security priorities in step 1009. In some instances, the enterprise organization may assign a higher security level to content parts associated with advertisements because advertisements may be more likely to contain malware and/or other malicious scripts. Further, the enterprise organization may assign a lower priority to video files and/or text files because the video files and/or text files may be less likely to harm the enterprise organization. In some examples, the enterprise organization may assign priorities for specific web pages and/or web applications. For example, the enterprise organization may frequently use certain web pages and/or web applications (e.g., the enterprise organization's web pages and/or web applications). The enterprise organization may assign priorities for the frequently used web pages and/or web applications.

Referring to FIG. 10C, in step 1011, the cloud service computing platform 910 may apply the policies and/or security priorities to the different content parts of the web page and/or web application. For example, based on the assigned security levels and/or policy files, the cloud service computing platform 910 may apply the policies and/or security priorities to the different content parts of the web page and/or web application. In some instances, by applying the policies and/or security priorities, the different content parts of the web page and/or web application may be rewritten. For example, the cloud service computing platform 910 may rewrite one or more content parts of the web page and/or web application using an HDX client engine.

In some embodiments, the cloud service computing platform 910 may apply the security policies and/or security priorities based on the user device 940 requesting the web page and/or web application. For example, the policy file may indicate that the user device 940 may have various levels of access (e.g., no access, read-only, read-write, and/or delete) to the web page and/or web application. The cloud service computing platform 910 may apply these various levels of access to the different content parts of the web page and/or web application. Each content part of the web page and/or web application may be assigned a different level of access for the user device 940. In one such example, the user device 940 may be able to read-write one content part of the web page and/or web application, but might not be able to view another content part of the web page and/or web application.

In some examples, the cloud service computing platform 910 may transmit, based on the policies and/or security priorities, the different content parts and/or content sections to the user device 940. For example, the cloud service computing platform 910 may determine a threshold level based on the policies and/or security priorities. If the assigned security levels for the content sections and/or content parts is greater than the threshold level, the cloud service computing platform 910 may transmit the content sections and/or content parts to the user device 940. If the assigned security levels for the content sections and/or content parts is less than the threshold level, the cloud service computing platform 910 might not send the content parts and/or content sections.

In some examples, the cloud service computing platform 910 may perform an optimization technique (e.g., a compression technique, a transcoding technique, and/or a caching technique), as explained below, based on the policies and/or security priorities. For example, the cloud service computing platform 910 may determine a threshold level based on the policies and/or security priorities. If the assigned security levels for the content sections and/or content parts is greater than the threshold level, the cloud service computing platform 910 may perform the optimization technique. If the threshold level is lower, the cloud service computing platform 910 might not perform the optimization technique.

In step 1012, the cloud service computing platform 910 may perform an optimization technique, such as a compression technique, on one or more content parts and/or content sections associated with the web page and/or web application. For example, the cloud service computing platform 910 may use a compression technique to compress information or data associated with one or more content parts and/or content sections. Using the compression technique, a file size for the content part and/or content section may decrease and the file may require less bandwidth to be transmitted to the user device 940. In some instances, the web server 930 may perform a compression technique prior to the cloud service computing platform 910 receiving the content part. In some examples, as explained above, the cloud service computing platform 910 may compress the one or more content parts and/or content sections based on the bandwidth priorities, network conditions, policy files, and/or the security priorities. In some instances, by applying the optimization technique (e.g., a compression technique), the different content parts of the web page and/or web application may be rewritten. For example, the cloud service computing platform 910 may rewrite one or more content parts of the web page and/or web application using an HDX client engine.

In step 1013, the cloud service computing platform 910 may perform an optimization technique, such as a transcoding technique, on one or more content parts and/or content sections associated with the web page and/or web application. For example, the cloud service computing platform 910 may use a transcoding technique to transcode information or data associated with the one or more content parts and/or content sections. Using the transcoding technique, the content part and/or content section may be converted, based on the endpoint capabilities of the user device 940, to a different file format. In some examples, as explained above, the cloud service computing platform 910 may transcode the one or more content parts and/or content sections based on the bandwidth priorities, network conditions, policy files, and/or the security priorities. In some instances, by applying the optimization technique (e.g., a transcoding technique), the different content parts of the web page and/or web application may be rewritten. For example, the cloud service computing platform 910 may rewrite one or more content parts of the web page and/or web application using an HDX client engine.

In step 1014, the cloud service computing platform 910 may perform an optimization technique, such as a caching technique, on one or more content parts and/or content sections associated with the web page and/or web application. For example, as described above, the cloud service computing platform 910 may use a docker or container to render the web page and/or web application. After rendering the web page and/or web application, the cloud service computing platform 910 may monitor and/or maintain the web page and/or web application in the docker or container even after responding to the request for the web application from user device 940. For example, the cloud service computing platform 910 may cache the result of rendering the web page and/or web application in the docker or container. If the cloud service computing platform 910 receives another request for the web page and/or web application, the cloud service computing platform 910 may use the cached web page and/or web application to respond to the request. In some instances, by applying the optimization technique (e.g., a caching technique), the different content parts of the web page and/or web application may be rewritten. For example, the cloud service computing platform 910 may rewrite one or more content parts of the web page and/or web application using an HDX client engine.

In some instances, the cloud service computing platform 910 may cache one or more content parts and/or content sections of the web page and/or web application. For example, rather than requesting resources from the web server 930 for a large file (e.g., the video file of the web page 1130) of the web page 1100 and/or web application, the cloud service computing platform 910 may cache one or more content parts and/or content sections. If the cloud service computing platform 910 receives another request for the web page and/or web application, the cloud service computing platform 910 may use the cached content parts and/or web page and/or web application to respond to the request. In some examples, as explained above, the cloud service computing platform 910 may cache the one or more content parts and/or content sections based on the bandwidth priorities, network conditions, policy files, and/or the security priorities.

Figure 10D:
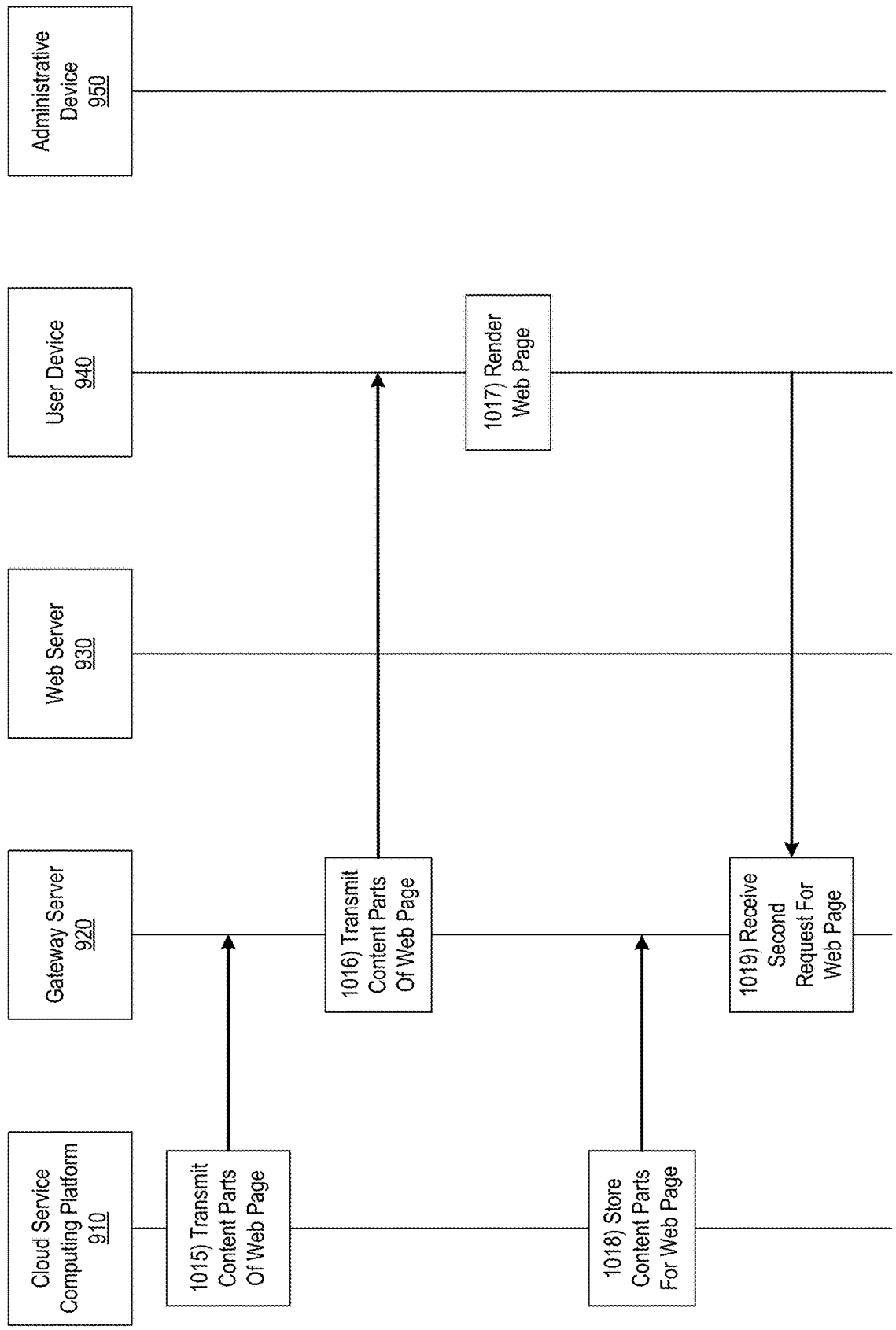

Referring to FIG. 10D, in step 1015, the cloud service computing platform 910 may transmit the content parts of the web page and/or the web application to the gateway server 920. For example, based on the optimization techniques described in steps 1012 through 1014 and/or based on the policies, security priorities, network conditions, and/or the bandwidth priorities, the cloud service computing platform 910 may transmit the content parts and/or content sections of the web page and/or the web application to the gateway server 920. As explained above, the optimization techniques (e.g., compression, caching, and/or transcoding) may be used on one or more content parts and/or content sections of the web page and/or web application. The cloud service computing platform 910 may use the policies, security priorities, network conditions, and/or bandwidth priorities to transmit the different content parts and/or content sections to the gateway server 920. In some instances, the cloud service computing platform 910 may transmit the content parts and/or content sections separately. For example, the cloud service computing platform 910 may transmit each content part and/or content section of the web page and/or web application separately. Further, in some instances, the cloud service computing platform 910 may transmit each content part and/or content section of the web page and/or web application through a virtual channel, such as an HDX virtual channel.

In step 1016, the gateway server 920 may transmit the content parts of the web page and/or the web application to the user device 940. For example, after gateway server 920 receives the content parts, the gateway server 920 may transmit the content parts and/or content sections of the web page and/or the web application to the user device 940. In some instances, the gateway server 920 may transmit one or more content parts and/or content sections separately. For example, the gateway server 920 may transmit each content part and/or content section of the web page and/or web application separately to the user device 940. Further, in some instances, the gateway server 920 may transmit each content part and/or content section of the web page and/or web application through a virtual channel, such as an HDX virtual channel.

In step 1017, the user device 940 may render the web page and/or web application. For example, after receiving the content parts and/or content sections for the web page and/or web application, the user device 940, using a rendering engine, may render the web page and/or web application. In some examples, the cloud service computing platform 910 may perform an optimization technique one or more content parts and/or content sections for the web page and/or web application as described above. By performing the optimization technique, the cloud service computing platform 910 may rewrite the one or more content parts and/or content sections. The user device 940 may include a client rendering engine, such as an HDX client rendering engine. The user device 940, using the client rendering engine, may receive and render the optimized and/or rewritten content parts and/or content sections.

In some instances, the user device 940 may receive content parts and/or content sections separately. For example, the user device 940 may receive, from a virtual channel (e.g., an HDX virtual channel), one or more content parts and/or content sections for the web page and/or web application. The user device 940 may determine whether one or more content parts and/or content sections for the web page and/or web application may be received at a later time. After the determination, the user device 940 may render the content parts and/or content sections for the web page and/or web application. In some examples, based on the policies, bandwidth priorities, network conditions, and/or security priorities, the one or more content parts and/or content sections might not be received by the user device 940. In such examples, the user device 940 may render and display the web page and/or web application without the one or more content parts and/or content sections. For example, referring to FIG. 11, the video section of the web page 1130 may be blocked by a policy file. The user device 940 may render and display the web page 1100 without the video section of the web page 1130. Additionally, and/or alternatively, the user device 940 may display the web page 1100 with an indication that the video section of the web page 1130 was blocked by the policy.

In some embodiments, the user device 940 may use a virtual channel (e.g., an HDX virtual channel) to receive the optimized content parts and/or content sections for the web page and/or web application. For example, the user device 940 may open a virtual channel between the user device 940 and the cloud service computing platform 910. The user device 940 may receive a user input (e.g., play video file 1130). The user device 940 may transmit the user input to the cloud service computing platform 910 via the virtual channel. After the cloud service computing platform 910 receives the user response, the cloud service computing platform 910 may transmit a response to the user input (e.g., play video file 1130) via the virtual channel. In some examples, the received user input may be a request for a new web page and/or web application. For example, the web page and/or web application may include a link to a new web page and/or web application. The user device 940 may receive a user input for the new web page and/or web application. The cloud service computing platform 910 may optimize the content parts and/or content sections for the new web page and/or web application and transmit, via the opened virtual channel, the optimized content parts and/or content sections for the new web page and/or web application. In some embodiments, the user device 940 may open and use a virtual channel for each of the content parts and/or content sections of the web page and/or web application.

In step 1018, the cloud service computing platform 910 may store one or more content parts and/or content sections for the web page. For example, as mentioned above, the cloud service computing platform 910 may store one or more content parts and/or content sections in a docker or container. If the cloud service computing platform 910 receives another request for the web page and/or web application, the cloud service computing platform 910 may use the stored content parts and/or content sections in the docker or container. In some instances, the web page and/or web application may be a frequently used enterprise web application and/or web page. The cloud service computing platform 910 may store the frequently used enterprise web application and/or web page in a docker or container associated with the enterprise organization and/or where the web page and/or web application was rendered in step 1005.

In some embodiments, the cloud service computing platform 910 may store one or more content parts and/or content sections for the web page and/or web application based on the bandwidth priorities, network conditions, policies, and/or security priorities. For example, the administrative device 950 for the enterprise organization may transmit instructions (e.g., based on the bandwidth priorities, policies, and/or security priorities) to the cloud service computing platform 910 to store one or more content parts and/or content sections for the web page. In some instances, the cloud service computing platform 910 may store the one or more content parts and/or content sections based on the file size. For example, the file size may prevent a content part and/or content section to be transmitted from the web server 930 to the cloud service computing platform 910 easily. In such examples, the cloud service computing platform 910 may store the content part and/or content section associated with the large file size.

In some instances, the cloud service computing platform 910 may store the content parts and/or content sections with the applied optimized techniques. For example, after optimizing the content parts and/or content sections described in steps 1012 through 1014 above, the cloud service computing platform 910 may store the optimized content parts and/or content sections. In some examples, the cloud service computing platform 910 may store the optimization techniques used to optimize the web page and/or web application. For example, the cloud service computing platform 910 may determine the effectiveness of applying the optimization techniques (e.g., the resources saved by using the optimization technique). In another iteration of the process, the cloud service computing platform 910 may determine, based on the effectiveness, whether to apply the optimization techniques to the one or more content parts and/or content sections for the web page and/or web application.

In step 1019, the gateway server 920 may receive a second request for the web page and/or web application from the user device 940. The second received request may be from the same user device 940 as the first received request described in step 1001. In some instances, the second received request may be from a different user device as the first received request. In some examples, the second received request may be a different user device as the first received request, but the user devices may be associated with the same enterprise organization.

Figure 10E:
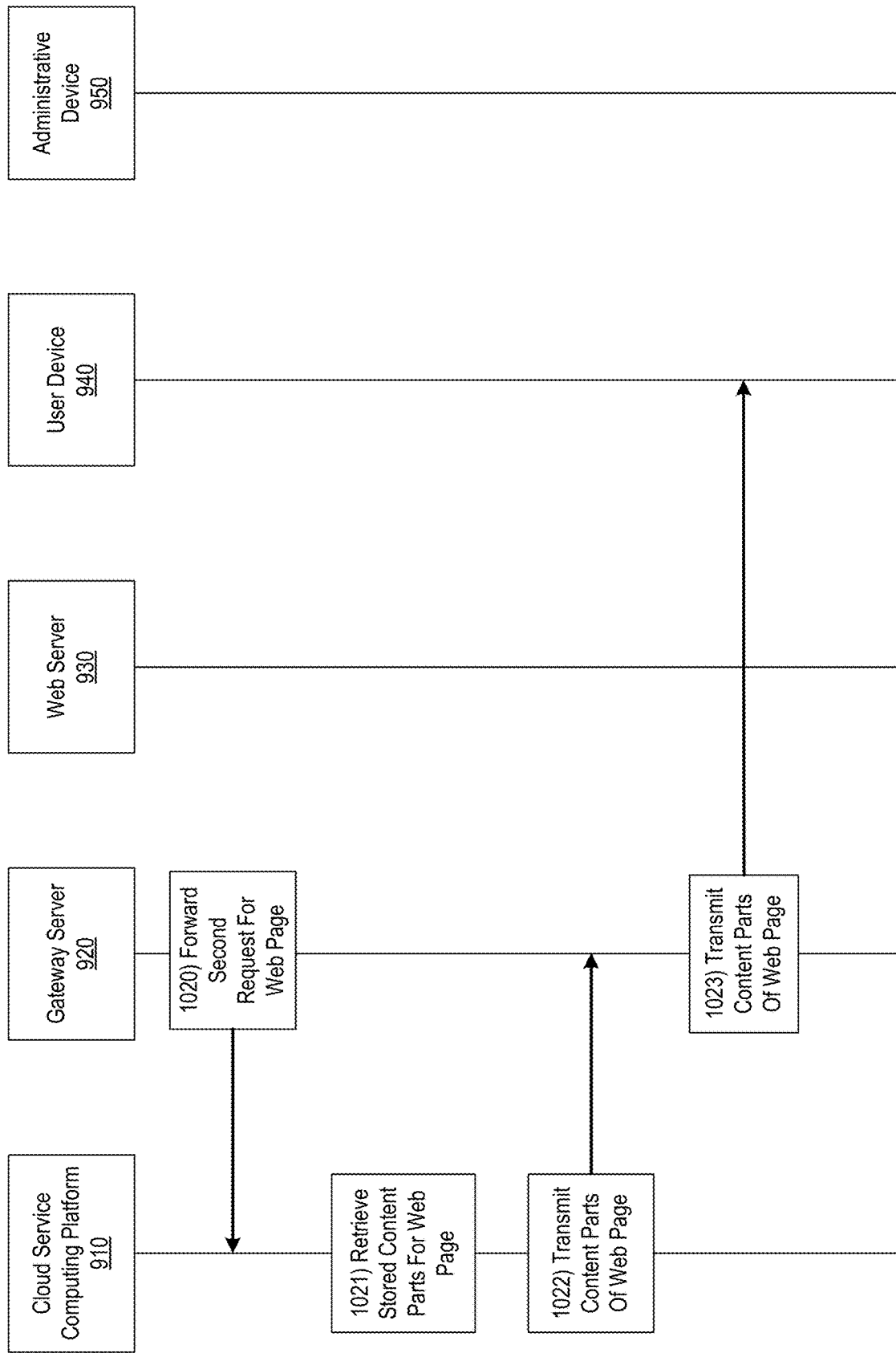

Referring to FIG. 10E, in step 1020, the gateway server 920 may forward the second request for the web page and/or web application to the cloud service computing platform 910. In step 1021, the cloud service computing platform 910 may retrieve the content parts for the web page and/or web application. For example, the cloud service computing platform 910 may store content parts and/or content sections of the web page and/or the web application as described in step 1018. The cloud service computing platform 910 may retrieve the stored content parts and/or content sections of the web page and/or web application. In some embodiments, the cloud service computing platform 910 may render, in a docker or container and using a headless browser, the content parts and/or content sections of the web page and/or web application that might not have been stored in step 1018. For example, in step 1018, the cloud service computing platform 910 might not have stored one or more content parts and/or content sections for the web page and/or web application. The cloud service computing platform 910 may retrieve, from the web server 930, the content parts and/or content sections that might not have been stored in the cloud service computing platform 910. The cloud service computing platform 910 may render and analyze the content parts and/or content sections. In some examples, the cloud service computing platform may use the stored optimization techniques in step 1018 for the web page and/or web application.

In step 1022, after retrieving the content parts and/or content sections for the web page and/or web application, the cloud service computing platform 910 may transmit the content parts and/or content sections of the web page and/or web application to the gateway server 920. The cloud service computing platform 910 may transmit the stored content parts and/or content sections in step 1018 and/or the rendered content parts and/or content sections in step 1021. In step 1023, the gateway server 920 may transmit the content parts and/or content sections of the web page and/or web application to the user device 940 requesting the web page and/or web application in step 1019.

Figure 13:
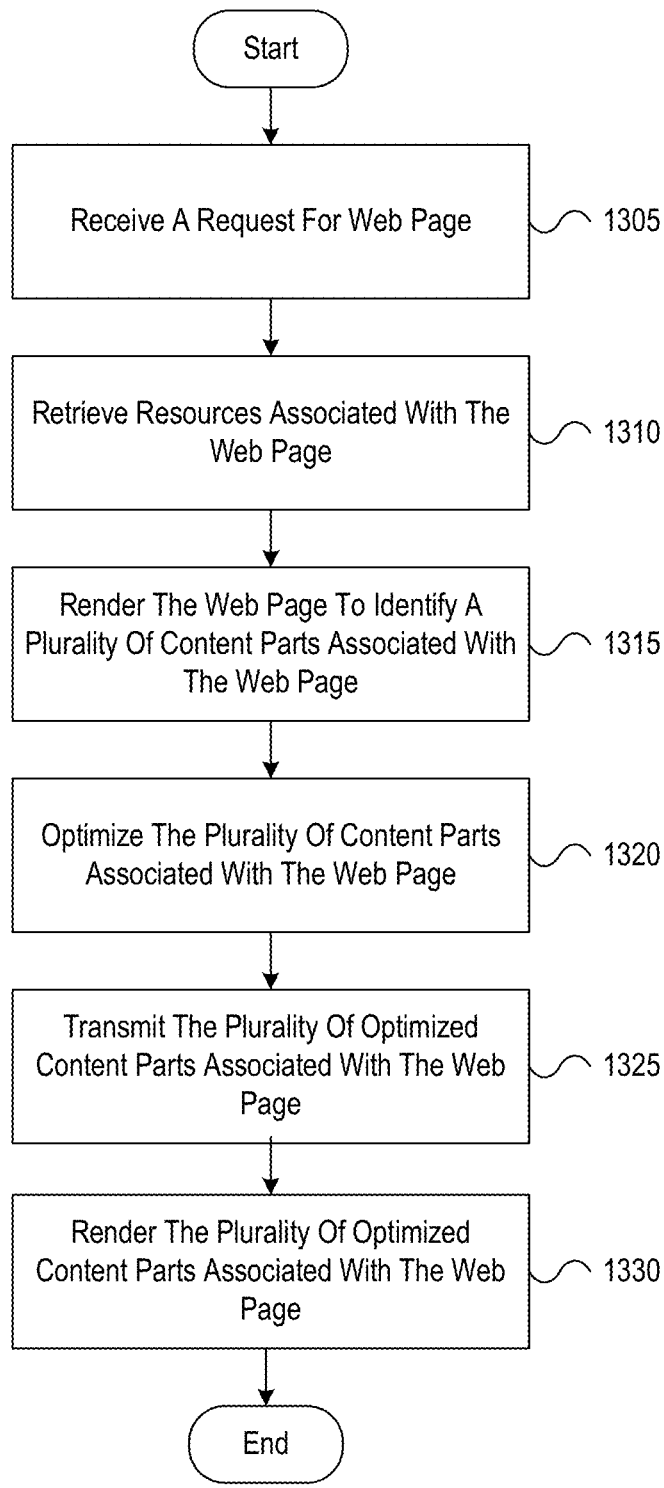
FIG. 13 depicts an example method of optimizing web applications using a rendering engine in accordance with one or more illustrative aspects described herein.

FIG. 13 depicts an example method of optimizing web applications using a rendering engine in accordance with one or more illustrative aspects described herein. Referring to FIG. 13, at step 1305, a cloud service computing platform having at least one processor, a communication interface, and a memory may receive, via the communication interface and from a user device, a request for a web page. At step 1310, the cloud service computing platform may retrieve resources associated with the web page. At step 1315, the cloud service computing platform may render the web page to identify a plurality of content parts associated with the web page. At step 1320, the cloud service computing platform may optimize the plurality of content parts associated with the web page. At step 1325, the cloud service computing platform may transmit, to the user device, the plurality of optimized content parts associated with the web page. At step 1330, the user device may render the plurality of optimized content parts associated with the web page.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
at a computing platform comprising at least one processor, memory, and a communication interface:
receiving, by the at least one processor, via the communication interface and a communication network, and from a user device, a request for a web page;
retrieving, by the at least one processor, via the communication interface, and from a server, the web page;
rendering, by the at least one processor and using a headless browser, the web page to identify a plurality of content parts associated with the web page;
assigning, by the at least one processor, a bandwidth priority, of a plurality of priorities, to each of the plurality of content parts associated with the web page;
based on comparing the bandwidth priority assigned to each of the plurality of content parts associated with the web page with a threshold indicating a condition of the communication network, determining, by the at least one processor, a subset of content parts of the plurality of content parts associated with the web page;
optimizing, by the at least one processor, the subset of content parts of the plurality of content parts associated with the web page, wherein the optimizing the subset of content parts of the plurality of content parts associated with the web page is based on the bandwidth priority associated with each of the subset of content parts; and
transmitting, by the at least one processor, via the communication interface, and to the user device, the subset of content parts of the plurality of content parts associated with the web page.

2. The method of claim 1, further comprising:
launching, by the at least one processor, the headless browser in a container; and
wherein the rendering the web page to identify the plurality of content parts associated with the web page is performed using the headless browser in the container.

3. The method of claim 1, wherein the request for the web page is received from the user device via a gateway server and wherein the method further comprises:
receiving, by the at least one processor, via the communication interface, and from the gateway server, optimization priorities; and
wherein the optimizing the subset of content parts of the plurality of content parts associated with the web page is based on the optimization priorities.

4. The method of claim 1, wherein the plurality of content parts associated with the web page comprises audio content, video content, text, images, static content, scripts, code, or cascading style sheets (CSS) associated with the web page.

5. The method of claim 1, wherein the optimizing the subset of content parts of the plurality of content parts associated with the web page comprises applying a compression technique to the subset of content parts of the plurality of content parts associated with the web page.

6. The method of claim 1, wherein the optimizing the subset of content parts of the plurality of content parts associated with the web page comprises transcoding the subset of content parts of the plurality of content parts associated with the web page.

7. The method of claim 1, further comprising:
caching, by the at least one processor, the plurality of content parts associated with the web page; and
in response to receiving a second request for the web page, reusing the plurality of content parts.

8. The method of claim 1, wherein the subset of content parts of the plurality of content parts associated with the web page is rendered by the user device using a client rendering engine.

9. The method of claim 1, further comprising:
optimizing, by the at least one processor, the plurality of content parts associated with the web page;
storing, by the at least one processor, the plurality of optimized content parts associated with the web page;
receiving, by the at least one processor, via the communication interface, and from a second user device, a second request for the web page;
retrieving, by the at least one processor, the plurality of optimized content parts associated with the web page; and
transmitting, by the at least one processor, via the communication interface, and to the second user device, the plurality of optimized content parts associated with the web page.

10. The method of claim 1, further comprising:
receiving, by the at least one processor and from an administrative device associated with an enterprise organization, the plurality of priorities, wherein the plurality of priorities is unique to the enterprise organization.

11. The method of claim 1, further comprising:
receiving, by the at least one processor, pluralities of priorities associated with a plurality of web pages; and
determining, by the at least one processor, from the pluralities of priorities, and based on the web page, the plurality of priorities for the web page.

12. A computing platform, comprising:
at least one processor;
a communication interface communicatively coupled to the at least one processor; and
memory storing computer-readable instructions that, when executed by the at least one processor, cause the computing platform to:
receive, by the at least one processor, via the communication interface and a communication network, and from a user device, a request for a web page;
retrieve, by the at least one processor, via the communication interface, and from a server, the web page;
render, by the at least one processor and using a headless browser, the web page to identify a plurality of content parts associated with the web page;
assign, by the at least one processor, a bandwidth priority, of a plurality of priorities, to each of the plurality of content parts associated with the web page;
based on comparing the bandwidth priority assigned to each of the plurality of content parts associated with the web page with a threshold indicating a condition of the communication network, determine, by the at least one processor, a subset of content parts of the plurality of content parts associated with the web page;
optimize, by the at least one processor, the subset of content parts of the plurality of content parts associated with the web page, wherein the optimizing the subset of content parts of the plurality of content parts associated with the web page is based on the bandwidth priority associated with each of the subset of content parts; and
transmit, by the at least one processor, via the communication interface, and to the user device, the subset of content parts of the plurality of content parts associated with the web page.

13. The computing platform of claim 12, wherein the memory stores additional computer-readable instructions, when executed by the at least one processor, cause the computing platform to:
launch, by the at least one processor, the headless browser in a container; and
wherein the rendering the web page to identify the plurality of content parts associated with the web page is performed using the headless browser in the container.

14. The computing platform of claim 12, wherein the memory stores additional computer-readable instructions, when executed by the at least one processor, cause the computing platform to:
cache, by the at least one processor, the plurality of content parts associated with the web page; and
in response to receiving a second request for the web page, reuse the plurality of content parts.

15. The computing platform of claim 12, wherein the optimizing the subset of content parts of the plurality of content parts associated with the web page comprises applying a compression technique to the subset of content parts of the plurality of content parts associated with the web page.

16. The computing platform of claim 12, wherein the optimizing the subset of content parts of the plurality of content parts associated with the web page comprises transcoding the subset of content parts of the plurality of content parts associated with the web page.

17. The computing platform of claim 12, wherein the memory stores additional computer-readable instructions, when executed by the at least one processor, cause the computing platform to:
optimize, by the at least one processor, the plurality of content parts associated with the web page; and
store, by the at least one processor, the plurality of optimized content parts associated with the web page;
receive, by the at least one processor, via the communication interface, and from a second user device, a second request for the web page;
retrieve, by the at least one processor, the plurality of optimized content parts associated with the web page; and
transmit, by the at least one processor, via the communication interface, and to the second user device, the plurality of optimized content parts associated with the web page.

18. The computing platform of claim 12, wherein the memory stores additional computer-readable instructions, when executed by the at least one processor, cause the computing platform to:
receive, by the at least one processor and from an administrative device associated with an enterprise organization, the plurality of priorities, wherein the plurality of priorities is unique to the enterprise organization.

19. One or more non-transitory computer-readable media storing instructions that, when executed by a computing platform comprising at least one processor, memory, and a communication interface, cause the computing platform to:
receive, by the at least one processor, via the communication interface and a communication network, and from a user device, a request for a web page;
retrieve, by the at least one processor, via the communication interface, and from a server, the web page;
render, by the at least one processor and using a headless browser, the web page to identify a plurality of content parts associated with the web page;
assign, by the at least one processor, a bandwidth priority, of a plurality of priorities, to each of the plurality of content parts associated with the web page;
based on comparing the bandwidth priority assigned to each of the plurality of content parts associated with the web page with a threshold indicating a condition of the communication network, determine, by the at least one processor, a subset of content parts of the plurality of content parts associated with the web page;
optimize, by the at least one processor, the subset of content parts of the plurality of content parts associated with the web page, wherein the optimizing the subset of content parts of the plurality of content parts associated with the web page is based on the bandwidth priority associated with each of the subset of content parts; and
transmit, by the at least one processor, via the communication interface, and to the user device, the subset of content parts of the plurality of content parts associated with the web page.

20. The one or more non-transitory computer-readable media of claim 19, wherein the instructions, when executed by the computing platform, further cause the computing platform to:
launch, by the at least one processor, the headless browser in a container; and
wherein the rendering the web page to identify the plurality of content parts associated with the web page is performed using the headless browser in the container.

* * * * *